Patented Mar. 11, 1947

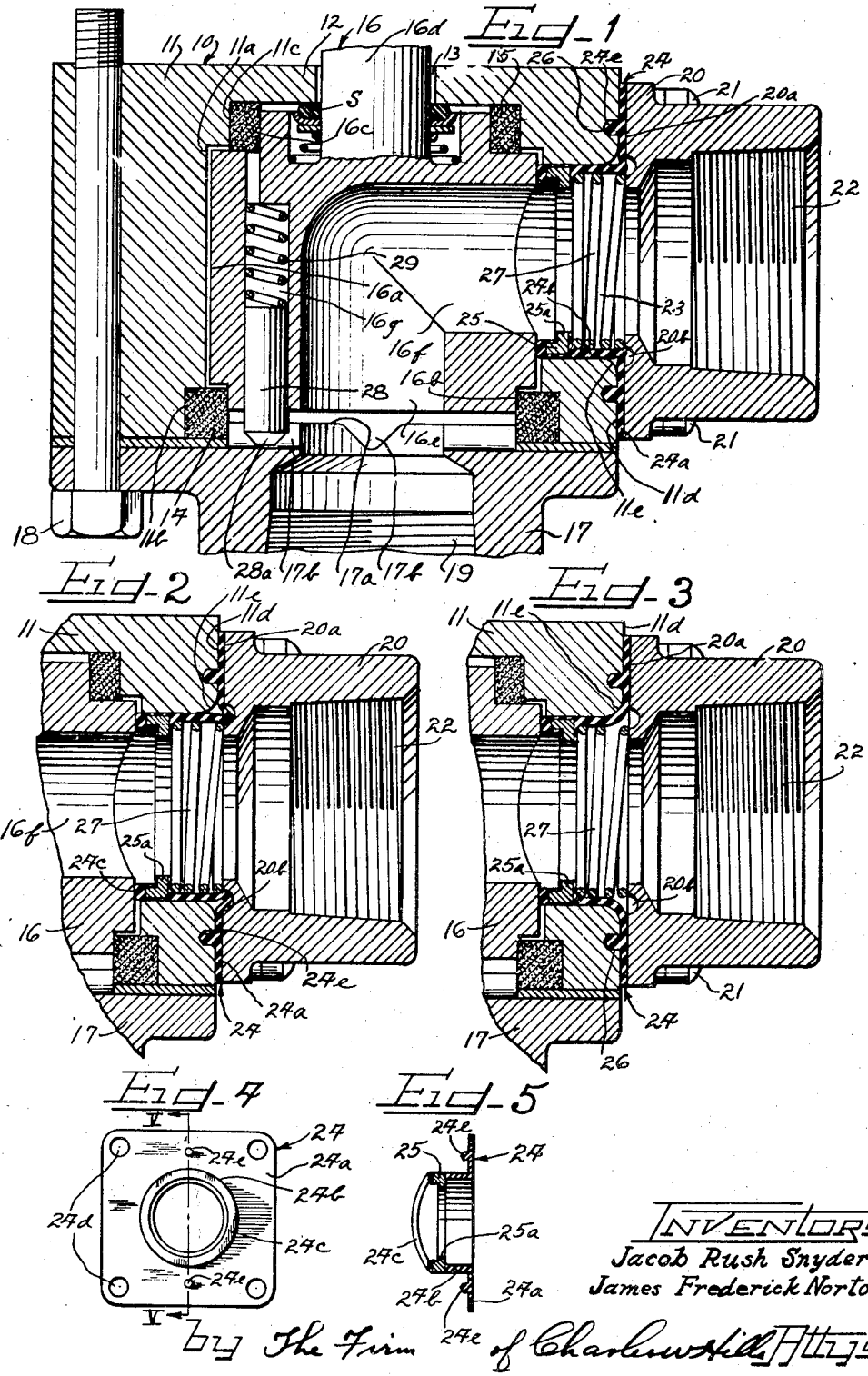

2,417,400

UNITED STATES PATENT OFFICE 2,417,400

SEAL AND GASKET ASSEMBLY

Jacob Rush Snyder, Cleveland, and James Frederick Norton, Cleveland He'ghts, Ohio, assignors to Thompson Products, Inc., Cleveland, Ohio, a corporation of Ohio Application January 22, 1945, Serial No. 573,958

7 Claims. (Cl. 251—113)

This invention relates to seal assemblies for fluid flow control devices wherein a unitary seal member serves a multiple sealing function.

Specifically this invention relates to a combination seal for a rotary valve and gasket for a nipple of the valve assembly.

In accordance with this invention, there is provided a deformable seal assembly including a sheet-like base or flange portion with an upstanding central collar or neck portion. The central collar portion has an end face contoured for sealing engagement with a rotary valve plug or the like while the base or flange portion is apertured to receive mounting studs or the like for a valve nipple or similar member to be attached to the body of a valve. The flange or base forms a gasket sealingly connecting the nipple and valve body. In order to rigidify the end face of the collar or neck portion, a metal ring is preferably embedded in this collar or neck portion. The metal ring preferably has an inturned flange providing a shoulder in the collar or neck portion. The shoulder is acted on by a spring which urges the end face into sealing engagement with the valve plug. The metal ring terminates in spaced relation from the base or flange portion so that the deformable material in the collar or neck portion ad'acent the flange or base portion can flex to act as a diaphragm.

The seals of this invention can shrink or swell without impairing sealing efficiency, since the diaphragm portion thereof will flex to accommodate the shrinking and swelling. The seals are readily assembled into valves and if the end face of the seal is contoured so that it must be seated in a valve housing in a particular position, there is preferably provided, on the base or flange portion of the seal, one or more projections for coacting with depressions in the valve housing so that the seal can only be mounted in the housing in the proper position.

It is, then, an object of this invention to provide a seal assembly having relatively movable portions each adapted to function as a seal.

A still further object of this invention is to provide a one-piece seal unit composed of deformable material such as rubber or the like and having a gasket-forming portion together with a valve sealing portion.

A still further object of this invention is to provide a one-piece seal including a flange portion adapted to function as a gasket and a tubular collar portion having an end face adapted to function as a seal for a valve plug.

A further object of this invention is to provide a valve seal having a tubular part with an end face contoured to sealingly engage the plug of the valve and an outside wall shaped to fit in the port of a valve housing together with an outturned flange adapted to function as a gasket between the valve housing and a part mounted on the valve housing.

A still further object of this invention is to provide a seal for selector valves and the like wherein a molded rubber member has a flange functioning as a gasket between a valve housing and a valve nipple mounted on the housing together with a tubular portion functioning as a port seal.

A still further object of the invention is to provide a rubber seal having a tubular portion with a rigid member embedded therein adjacent the end face thereof for rigidifying the end face.

Other and further objects of this invention will be apparent to those skilled in the art from the following detailed description of the annexed sheet of drawings which, by way of preferred example only, illustrates one embodiment of the invention.

On the drawings:

Figure 1 is a vertical cross-sectional view of a selector valve or shut-off cock embodying a seal and gasket assembly according to this invention.

Figure 2 is a fragmentary cross-sectional view similar to Figure 1 but illustrating the position of the seal assembly when in swollen condition.

Figure 3 is a view similar to Figure 2, but illustrating the position of the seal assembly when in dried out or shrunk condition.

Figure 4 is a plan view of a seal unit according to this invention.

Figure 5 is a vertical cross-sectional view taken along the line V—V of Figure 4.

As shown on the drawings:

In Figure 1 the reference numeral 10 designates generally a valve having a body member 11 with a cylindrical bore 11a extending inwardly from one face thereof and providing a valve operating chamber. The bore 11a is counterbored as at 11b at one face of the body and has a reduced diameter portion 11c at the other end thereof terminating in an end wall portion 12 which is apertured at 13 to provide a reduced opening in the other face of the body. The counterbore 11b has a first carbon bearing ring 14 therein. The reduced diameter portion 11c has a second carbon bearing ring 15 therein.

A valve plug 16 has a main cylindrical portion 16a with reduced diameter ends 16b and 16c together with a stem 16d projecting from the central portion of the reduced end 16c. The reduced end 16b is rotatably mounted in the carbon bearing ring 14. The reduced end 16c is rotatably mounted in the carbon ring 15. The stem 16d projects freely through the aperture 13, and leakage along the stem through the aperture is prevented by a spring pressed rubber-like O ring seal assembly S. As shown, the seal assembly S surrounds the stem 16d in a well provided in the plug 16. It is composed of a rubber-like O ring seated in a metal retainer backed by a metal washer which is spring pressed by a coil spring bottomed on the plug to press the O ring against the casing end wall 12.

The carbon bearing rings 14 and 15 hold the main cylindrical portion 16a of the valve in spaced relation from the wall of the bore 11a. An end cover 17 is secured on the bottom face of the body 11 and bolts such as 18 are passed through the cover and body to serve for mounting the valve 10 on a support (not shown). The cover 17 has an outlet 19 arranged for flowing liquids or other material out of the valve body 11. The plug 16 has an axial outlet passage 16e aligned with the outlet 19 together with a radial inlet passage 16f opening through the main cylindrical portion 16a of the plug.

A nipple 20 is bolted to a side face of the body 11 as by means of bolts 21. This nipple provides a radial inlet 22 for the valve body communicating with an inlet port 23 in the side wall of the valve body. The inlet port 23 is cylindrical and has a diameter greater than the diameter of the inlet passage 16f of the plug 16.

In accordance with this invention there is provided a combination port seal and nipple gasket 24. This combination seal and gasket 24, as best shown in Figures 4 and 5, includes a one-piece rubber member having a flat base or flange portion 24a and an upstanding cylindrical sleeve or collar portion 24b. The portion 24b has an outside diameter sized for snugly fitting the cylindrical wall of the port 23 together with an inside diameter larger than the diameter of the inlet passage 16f of the plug 16. The sleeve or collar has an end face 24c contoured to engage around its entire periphery the cylindrical surface of the main valve plug portion 16a.

A metal ring 25 is embedded in the collar portion 24b adjacent the end face 24c for rigidifying this end face and for preventing the collar from collapsing inwardly. The metal ring has a radially inward projecting flange 25a forming a shoulder in the collar or sleeve 24b. The portion of the collar between this shoulder and the flange or base 24a is flexible and, as will be hereinafter more fully described, cooperates with the flange to form a diaphragm.

The flange or base 24a is sized for covering the end face of the nipple 20 and has holes 24d in the corners thereof to accommodate passage of the nipple-mounting bolts 21.

Small lugs 24e are provided on the flange or base portion 24a to project forwardly in the same direction as the upstanding collar 24b in spaced relation from this collar. Since the end face 24c of the collar is contoured to fit against a cylindrical plug portion 16a, the rubber piece 24 must be mounted on the housing 11 in a particular position and these lugs 24e coact with drilled holes 26 in the side face 11d of the valve body 11. These lugs 24e and holes 26 cooperate to serve as mounting guides for the seal piece 24 and it is only necessary to insert the collar 24b in the port 23 and rotate the flange 24a on the end face 11d of the body until the lugs 24e seat in the holes 26. When this seating has been accomplished, the end face 24c of the collar is automatically correctly positioned to seat on the cylindrical valve plug.

The nipple 20 has an end face 20a opposing the side wall 11d of the body and receiving the flange or base 24a of the seal member 24 thereagainst. This end face 20a extends radially inward of the collar portion 24b of the seal member 24 and is provided with a groove 20b that is substantially axially aligned with the collar portion.

The housing or valve casing 11 has a rounded or otherwise outwardly flared surface 11e providing a mouth for the port 23 opposing the groove 20b.

A coil spring 27 is bottomed on the radially inwardly projecting portion of the nipple end face 20a inwardly of the groove 20b and acts on the shoulder provided by the flange 25a of the ring in the collar portion 24b to urge the end face 24c of the collar into sealing engagement with the plug portion 16a. The coils of the spring 27 are in snug fitting engagement with the collar 24b and are closely spaced so as to reinforce said flexible portion of the collar behind the metal ring 25 against inward collapse.

As shown in Figure 1, the flexible diaphragm portion of the collar 24b behind the metal ring 25 and the adjacent portion of the flange 24a normally lie in spaced relation from the rounded casing wall 11e and the wall defining the groove 20b of the nipple 20. Spaces are thus provided on opposite sides of the junction between the flange 24a and the collar 24b.

When the rubber member 24 swells as, for example, when it is in contact with aromatic fluid or the like, the collar 24b might elongate and, as shown in Figure 2, the groove 20b of the nipple 20 receives the diaphragm at the junction between the collar and flange.

When the rubber seal 24 dries out, it might shrink and, as shown in Figure 3, the diaphragm portion at the junction of the collar and flange can bend and hug the rounded wall 11e of the casing 11.

The plug 16 has bores such as 16g therein around the axial passageway 16e for slidably receiving pins 28 which are backed by springs such as 29. The pins have beveled leading ends 28a adapted to ride on the end face 17a of the cover 17 and seat in notches 17b at spaced intervals along this end wall so that when the plug 16 is rotated the pins, in riding into and out of the notches, will serve as position finders permitting the operator to easily align the inlet passage 16f with the ports such as 23 of the body.

From the above descriptions it will be understood that this invention now provides a one-piece rubber seal having a base portion or flange portion serving as a gasket for a valve nipple together with a collar or sleeve portion serving as a port seal for the valve. The free end portion of the collar or sleeve is rigidified by an embedded ring providing a shoulder in the collar against which a spring acts to urge the end face of the collar into sealing engagement with the plug of the valve. The valve casing and the valve nipple are provided with opposed space-defining surfaces so that a flexible portion of the one-piece seal adjacent the junction between the collar and flange thereof can move freely to accommodate shrinking and swelling of the seal material without in any way breaking the seal contact between the end face of the collar and the valve plug. The mounting bolts for the nipple of the valve tighten the gasket-defining portion of the seal into fixed sealing relation between the nipple and the valve casing but the sleeve portion of the seal and the diaphragm portion including the junction area between the sleeve and gasket are free to move relative to the port of the valve.

It will, of course, be understood that various details of construction may be varied through a wide range without departing from the principles of this invention and it is, therefore, not the purpose to limit the patent granted hereon otherwise than necessitated by the scope of the appended claims.

We claim as our invention:

1. A seal assembly comprising a valve body having a flat face and a port having a beveled mouth communicating with said face, a valve element shiftably mounted in said valve body, a rubber member having a tubular portion snugly seated in said port with an end face thereof contoured for fitting against said valve element and an outturned flange portion overlying said end face, a nipple member overlying said flange, means connecting said nipple member with said body member, said nipple member having a wall portion with an annular groove therein, said rubber member having a diaphragm area adjacent the junction of the tubular and flanged portions thereof, a coil spring bottomed on said wall portion, and a ring embedded in said tubular portion providing a shoulder in said tubular portion receiving said coil spring thereagainst whereby the end face of the tubular portion is urged into sealing engagement with said valve element, said beveled mouth of the port and said groove of the nipple providing opposed spaces for receiving the diaphragm area therein to accommodate swelling and shrinkage of the seal without changing the sealing contact between the end face of the tubular portion and the valve element.

2. A valve assembly comprising a valve body having a face with a port therein, a valve element shiftably mounted in said body for opening and closing said port, a valve nipple mounted on said face of the body having a passageway aligned with said port, a combination port seal and gasket having a tubular part seated in said port and a flange part disposed between said nipple and said face of the body, and a coil spring bottomed on said nipple acting on said tubular part of the seal for urging the end face of the tubular part into sealing engagement with said valve element of the valve.

3. A seal assembly for a rotary plug type valve which comprises a valve body having an end face with a port therein, a valve plug rotatably mounted in said body for opening and closing said port, and a nipple secured to said valve body having a passage communicating with said port and an end wall with a groove therein aligned with said port, a combination port seal and gasket having a tubular part snugly seated in said port with an end face thereof in sealing engagement with the plug of the valve and a flange part disposed between said end face of the valve and said end wall of the nipple, a coil spring bottomed on said end wall of the nipple acting on said tubular part to urge said end face thereof into sealing engagement with said valve plug, and said groove in the end wall of the nipple adapted to receive a portion of the seal therein upon swelling of the seal.

4. In combination with a plug valve having a valve body, a rotary valve plug therein, and a member mounted on the body cooperating therewith to define opposed spaces, a unit having a flange portion forming a gasket between the body and member, a sleeve portion projecting into the body with an end face in sealing contact on the plug, and a flexible diaphragm portion between the flange portion and sleeve portion adapted to flex into said opposed spaces for accommodating shrinkage and swelling without disturbing the sealing contact on the plug.

5. A valve assembly comprising a valve body having a face with a port therein, a valve element shiftably mounted in said body for opening and closing said port, a member mounted on said face of the body and having portions thereof overlying said port, a combination port seal and gasket having a tubular part seated in said port and an integral flange part disposed between said member and said body in gasket relation, means defining an inwardly projecting shoulder within said tubular part, and a coil spring bottomed on said overlying portions of said member and acting on said shoulder of said tubular part for urging the end face of the tubular part into sealing engagement with said valve element of the valve.

6. A valve assembly comprising a valve body having a face with a port therein, a valve plug rotatably mounted in said body for opening and closing said port, a valve nipple mounted on said face of the body having a passageway aligned with said port but smaller than said port, a combination port seal and gasket member of deformable material having a tubular part seated in said port and an integral flange part disposed between said nipple and said body in gasket relation, a rigid ring embedded in said tubular part adjacent said sealing end face and defining an inwardly projecting shoulder in said tubular part, and a coil spring mounted on said nipple and acting on said shoulder of said tubular part for urging the end face of said tubular part into sealing engagement with the plug of the valve.

7. A valve assembly comprising a hollow valve body having a face with a port therein communicating with the interior of the body, a generally cylindrical valve plug rotatably mounted in said body with the cylindrical surface thereof movable past said port, said plug having an aperture therethrough opening in said cylindrical surface and alignable with said port, a valve nipple mounted on said face of the body having a passageway aligned with said port but smaller than said port, a deformable member having a tubular part seated in said port and an integral flange part disposed between said nipple and said body in gasket relation, and a coil spring bottomed on said nipple and acting on said tubular part to urge the end face of the tubular part into sealing engagement with said cylindrical surface of said plug, said end face being contoured to conform to said plug cylindrical surface.

JACOB RUSH SNYDER.
JAMES FREDERICK NORTON.

REFERENCES CITED

The following references are of record in the file of this patent:

UNITED STATES PATENTS

| Number | Name | Date |
|---|---|---|
| 2,380,983 | Mock | Aug. 7, 1945 |
| 774,490 | Paine | Nov. 8, 1904 |
| 2,316,974 | Risley | Apr. 20, 1943 |
| 1,879,481 | Putnam | Sept. 27, 1932 |
| 2,173,949 | Neveu | Sept. 26, 1939 |
| 2,201,895 | Glen | May 21, 1940 |
| 2,373,628 | Gleeson | Apr. 10, 1945 |

FOREIGN PATENTS

| Number | Country | Date |
|---|---|---|
| 499,150 | Britain | Jan. 19, 1939 |